United States Patent [19]

Dean

[11] 4,055,899
[45] Nov. 1, 1977

[54] AXLE ALIGNMENT MACHINE

[76] Inventor: Floyd E. Dean, Box 124, Morning Sun, Iowa 52640

[21] Appl. No.: 672,006

[22] Filed: Mar. 30, 1976

[51] Int. Cl.[2] ............................ G01B 3/14; G01B 5/25
[52] U.S. Cl. .................................. 33/193; 33/203.13; 33/203.15
[58] Field of Search ............... 33/193, 203.13, 203.15, 33/203.16, 203.18, 335, 288

[56] References Cited
U.S. PATENT DOCUMENTS

| | | | |
|---|---|---|---|
| 3,137,076 | 6/1964 | Hurst | 33/193 |
| 3,897,636 | 8/1975 | Leblanc | 33/203.13 |

Primary Examiner—Steven L. Stephan
Attorney, Agent, or Firm—Wm. T. Metz

[57] ABSTRACT

An axle alignment machine on which a trailer can be driven and fastened, simulating the fastening of a trailer to a fifth wheel of a tractor. The machine having a pit located therein which contains carriages that move on tracks. The carriages support the wheels of a trailer so that with plumb bobs and markings in the pit a static alignment of the axles of the trailer may be obtained and with the use of motors to turn wheel rollers on the carriages a dynamic alignment of the axles of the trailer may be obtained.

2 Claims, 3 Drawing Figures

U.S. Patent  Nov. 1, 1977  4,055,899
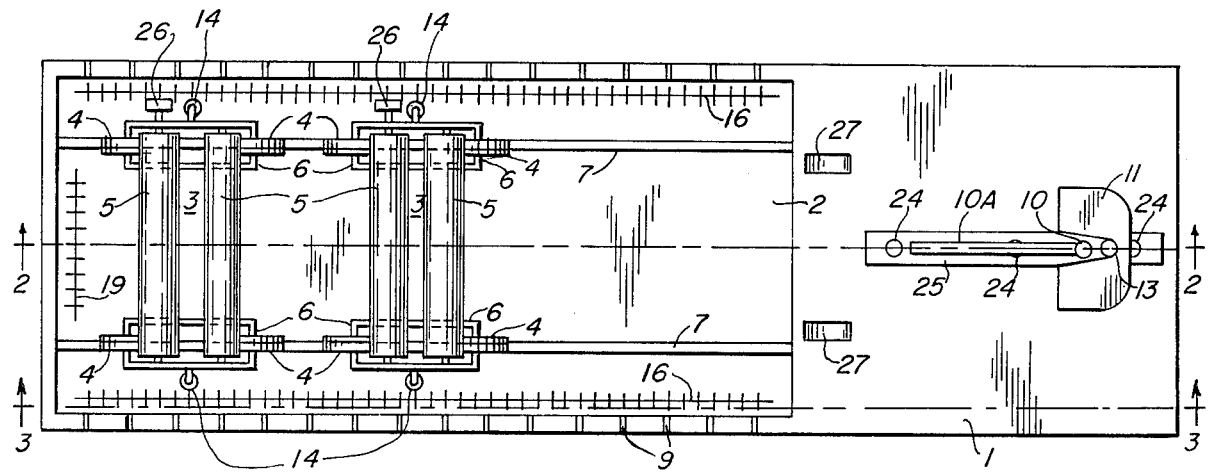
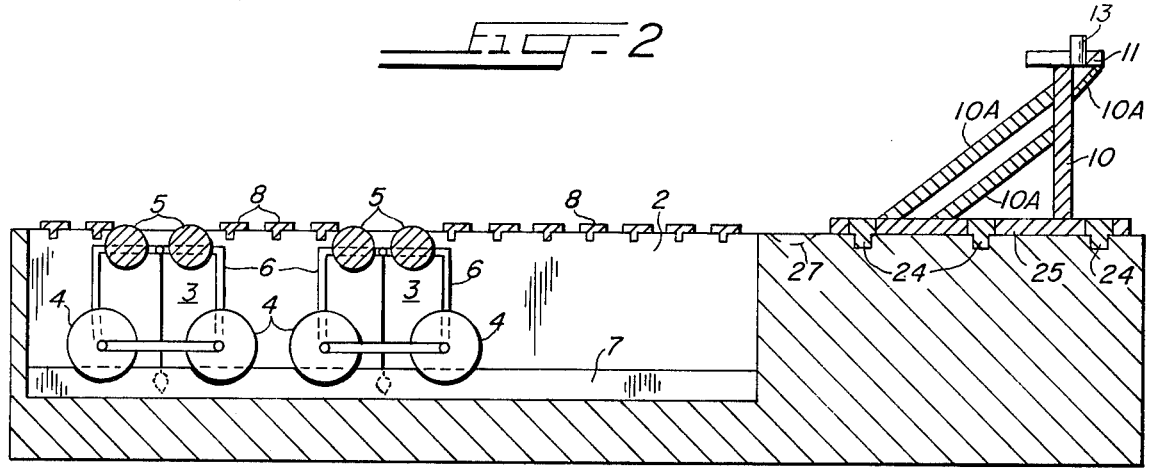
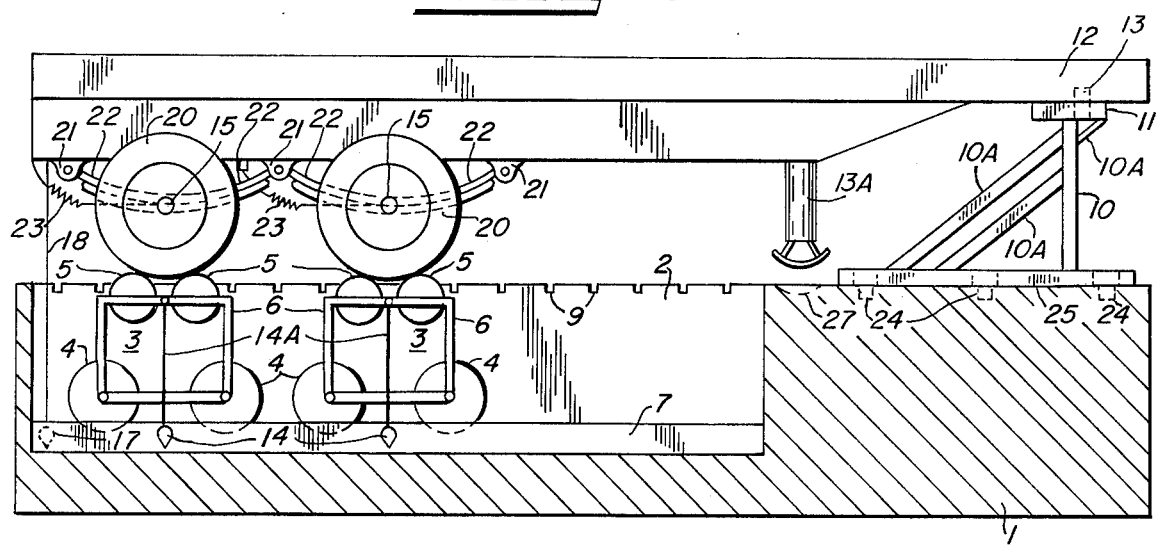

AXLE ALIGNMENT MACHINE

BACKGROUND OF THE INVENTION

1. Field of the Invention

This invention pertains to axle alignment machines and more particularly to an alignment machine designed to use both the static and dynamic method of aligning axles on trailers and other vehicles.

2. Description of the Prior Art

Heretofore axle alignment machines have not used both the static and dynamic method but have merely used the static method. It is known that one means to align axles on trailers is to use a road test, noticing the degree that the rear of the trailer runs to the right or the left of the center of an imaginary line extending from the king pin on the trailer rearward towards the back of the trailer. Adjustments were then made to the axles and by a trial and error method the trailer was eventually made to run true.

SUMMARY OF THE INVENTION

The axle alignment machine herein described provides a means to align single or tandem axles without having to road test the trailer.

It is, therefore, an object of this invention to provide an axle alignment machine which will give both a static and dynamic alignment to trailer axles.

It is a further object of this invention to provide an axle alignment machine which will align both single and tandem axle trailers.

It is a further object of this invention to provide an axle alignment machine which will simulate loaded conditions, thus providing more accurate dynamic alignment.

It is a further object of this invention to provide an axle alignment machine which eliminates the necessity of road trial and error testing.

It is a further object of this invention to provide an axle alignment machine which is relatively inexpensive to construct and operate.

Further objections and advantages of this invention will become apparent from the following drawing, description and claims.

BRIEF DESCRIPTION OF THE DRAWING

FIG. 1 is a plan view of the axle alignment machine.

FIG. 2 is a sectional view, taken on line 2—2 of FIG. 1, showing T-irons in place in preparation for moving a trailer onto the machine.

FIG. 3 is a sectional view, taken on line 3—3 of FIG. 1, with a trailer shown moved into place on the machine.

DESCRIPTION OF THE PREFERRED EMBODIMENT

Referring now to the drawing, the axle alignment machine has a base 1 which may be made of concrete or other substantial material. A portion of the base 1 is in the form of a pit 2 which receives carriages 3. The carriages 3 are comprised of a set of track rollers 4 and a set of wheel rollers 5 mounted on frames 6. Tracks 7 are laid in the pit 2 of the base 1. Removable T-irons 8 fit into slots 9 in the base 1. A stand 10 with supports 10A is mounted on the forward portion of the base 1 so as to hold a fifth wheel 11 which simulates the fifth wheels used on tractors which pull trailers, such as trailer 12. The king pin 13 slides into place as the trailer 12 is moved onto the base 1. The trailer 12 has a set of forward legs 13A which are used to support the trailer 12 on base 1 prior to it being fastened onto the fifth wheel 11. Plumb bobs 14 are dropped from the center of the carriages 3 on lines 14A so as to register over the markings 16 in the pit 2 of the base 1. A rear plumb bob 17 is dropped on a line 18 from the center of the rear of the trailer 12 over markings 19 on the floor of the pit 2. Trailer wheels 20 are supported on the wheel rollers 5. Supports 21 on the trailer 12 hold springs 22 which are fastened to the axles 15. A normal adjusting means (not shown) on the trailer 12 makes it possible to vary the angle of the axles 15 to bring them in proper alignment. Springs 23, shown diagrammatically, are fastened between the rear portion of the trailer 12 and the center of the axles 15. Bolts 24 fasten the stand 10 onto the front portion of the base 1 so as to make the stand 10 adjustable on the front portion of the base 1. Adjustment is done by means of slots (not shown) in the base portion 25 of the stand 10.

In operation a trailer 12 is moved onto the base 1 of the axle alignment machine with T-irons 8 in place. The T-irons 8 support the wheels 20 of the trailer 12 until said wheels come to rest on the wheel rollers 5 of the carriages 3. The T-irons 8 and the top of the forward portion of the base 1 may be set flush with the surrounding floor to make it possible to move the trailer 12 directly onto the axle alignment machine. The carriages 3 are preset on tracks 7 to receive the wheels 20. After the trailer 12 is in place on the axle alignment machine the T-irons 8, which would interfere with the movement of the carriages 3 on the tracks 7, are removed. Plumb bobs 14 are then dropped by the lines 14A over the markings 16 which are calibrated. Alignment may thus be obtained and if the axles 15 are seriously out of alignment, adjustment may be made to bring them into as close an alignment as can be by the static alignment method. The plumb bob 17 is then dropped from the center of the rearward portion of the trailer 12 over the markings 19 which are also calibrated. The trailer 12 is placed on the axle alignment machine so that the plumb bob 17 is over the center of the markings 19 in the static condition. Motors 26 are then started which revolve wheel rollers 5. Wheels 20 then are turned by the turning of wheel rollers 5 and the trailer 12 will drift to the right or the left of the pit 2 if there is a misalignment of the axles 15. The drift is indicated by the plumb bob 17 over the markings 19. Further adjustments may be made to the axles 15 as supported on the trailer 12 so that eventually proper alignment is obtained under dynamic conditions.

Springs 23 may then be fastened between the center of the axles 15 and the rear portion of the trailer 12 which will simulate a load on the trailer 12. This will give even a better dynamic adjustment because it is under simulated load conditions.

It is also possible to align vehicles other than trailers, such as the tractor used to pull trailers, by having the front wheels of a tractor (not shown) inserted into the grooves 27 shown in the forward portion of the base 1 and the rear wheels of the tractor (not shown) placed on the carriages 3 as are the wheels of the trailer 12.

I claim:

1. An axle alignment machine comprised of a base having a forward portion and a rearward portion, a stand supporting a fifth wheel located on the forward portion of the base, a pit located in the rearward portion of the base, removable supports extending across the pit, tracks located in the pit, a plurality of carriages, each carriage having a frame, a plurality of track rollers and a plurality of wheel rollers turnably mounted on each frame, the track rollers being in movable engagement with the tracks, the wheel rollers being mounted on the carriages in fixed relation to the track rollers, markings in the pit along the tracks, plumb bobs attached to the carriages to read over the markings along the tracks, the wheel rollers being mounted in fixed relation to each other and the track rollers to support the wheels of a trailer fastened to the fifth wheel, additional markings across the rear of the pit, a rear plumb bob attached to the rear of the trailer to read over the additional markings across the rear of the pit, motors attached to the wheel rollers to turn the wheel rollers.

2. A method of aligning axles on trailers comprised of providing a base having a forward portion and a rearward portion, a stand supporting a fifth wheel located on the forward portion of the base, a pit located in the rearward portion of the base, removable supports extending across the pit, tracks located in the pit, a plurality of carriages, each carriage having a frame, a plurality of track rollers and a plurality of wheel rollers turnably mounted on each frame, the track rollers being in movable engagement with the tracks, the wheel rollers being mounted on the carriages in fixed relation to the track rollers, markings in the pit along the tracks, plumb bobs attached to the carriages to read over the markings along the tracks, the wheel rollers being mounted in fixed relation to each other and the track rollers to support the wheels of a trailer fastened to the fifth wheel, additional markings across the rear of the pit, a rear plumb bob attached to the rear of the trailer to read over the additional markings across the rear of the pit, motors attached to the wheel rollers to turn the wheel rollers, placing the wheels of the trailer on the wheel rollers, removing the supports near the carriages from the pit after the wheels of the trailer are placed on the wheel rollers, providing a plurality of springs attached from the rear portion of the trailer to the axles of the trailer to simulate a load on the trailer, operating the motors attached to the wheel rollers, measuring the amount of drift to the right or left of the axles by reading the markings across the rear of the pit adjacent the rear plumb bob, adjusting the axles of the trailer so that the axles will have no drift to the right or the left on the track rollers when the motors attached to the wheel rollers are running.

* * * * *